United States Patent
Dutton

(10) Patent No.: US 11,815,393 B2
(45) Date of Patent: *Nov. 14, 2023

(54) IMAGE SENSOR INCLUDING PHOTODIODE ARRAY COMPRISING A FIRST TRANSISTOR COUPLED TO A PHOTODIODE TO RECEIVE A COLUMN ENABLE SIGNAL AND A SECOND TRANSISTOR COUPLED TO THE PHOTODIODE TO RECEIVE A COLUMN DISABLE SIGNAL

(71) Applicant: STMicroelectronics (Research & Development) Limited, Marlow (GB)

(72) Inventor: Neale Dutton, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 96 days.

This patent is subject to a terminal disclaimer.

(21) Appl. No.: 17/486,750

(22) Filed: Sep. 27, 2021

(65) Prior Publication Data
US 2022/0011160 A1     Jan. 13, 2022

Related U.S. Application Data

(63) Continuation of application No. 16/800,987, filed on Feb. 25, 2020, now Pat. No. 11,137,285.

(30) Foreign Application Priority Data

Feb. 28, 2019 (EP) ..................................... 19160078

(51) Int. Cl.
*G01J 1/44*      (2006.01)

(52) U.S. Cl.
CPC ........... *G01J 1/44* (2013.01); *G01J 2001/442* (2013.01); *G01J 2001/4466* (2013.01)

(58) Field of Classification Search
CPC ......... G01J 1/44; G01J 2001/44; G01S 7/497; G01S 7/486; H04N 5/376; H04N 5/378; H04N 5/367; H04N 25/74; H04N 25/77
USPC ......................................... 250/214 R, 208.1
See application file for complete search history.

(56) References Cited

U.S. PATENT DOCUMENTS

| 7,786,921 | B2 | 8/2010 | Nitta et al. | |
|---|---|---|---|---|
| 2007/0108369 | A1* | 5/2007 | Huang | H04N 25/616 348/E3.021 |
| 2011/0079727 | A1 | 4/2011 | Prescher et al. | |
| 2012/0129274 | A1 | 5/2012 | Prescher et al. | |

* cited by examiner

*Primary Examiner* — Que Tan Le
(74) *Attorney, Agent, or Firm* — Seed IP Law Group LLP

(57) ABSTRACT

A sensor has plurality of pixels arranged in a plurality of rows and columns with row control circuitry for controlling which one of said rows is activated and column control circuitry for controlling which of said pixels in said activated row is to be activated. The column circuitry has memory configured to store information indication as to which of the pixels are defective, wherein each of the pixels has a photodiode and a plurality of transistors which control the activation of the photodiode. A first transistor is configured to be controlled by a column enable signal while a second transistor is configured to be controlled by a row select signal.

20 Claims, 10 Drawing Sheets

IMAGE SENSOR INCLUDING PHOTODIODE ARRAY COMPRISING A FIRST TRANSISTOR COUPLED TO A PHOTODIODE TO RECEIVE A COLUMN ENABLE SIGNAL AND A SECOND TRANSISTOR COUPLED TO THE PHOTODIODE TO RECEIVE A COLUMN DISABLE SIGNAL

BACKGROUND

Technical Field

Some embodiments relate to an apparatus and in particular but not exclusively to an apparatus with an array of photosensitive devices.

Description of the Related Art

Range and distance detection using light is known. Systems known as LIDAR (light detection and ranging) have many applications including consumer electronics, automotive, robotics, surveying and so on.

An example LIDAR system uses a light source, for example a vertical cavity surface emitting laser (VCSEL), to generate light pulses which are reflected from a surface and then detected at a receiver or detector, for example a photodiode or single photon avalanche diode (SPAD) array.

The time difference between the light being transmitted and received provides the distance or range value using the equation $D=0.5\times S*T$, where T is the time difference, S the speed of light and D the distance from the transmitter to the reflecting object.

BRIEF SUMMARY

According to some embodiments, there is provided a sensor comprising: a plurality of pixels arranged in a plurality of rows and columns; row control circuitry for controlling which one of said rows is activated; and column control circuitry for controlling which of said pixels in said activated row is to be activated, said column circuitry comprising a memory configured to store information indication which of said pixels are defective, wherein each of said pixels comprises a photodiode and a plurality of transistors configured to control the activation of said photodiode, wherein a first transistor is configured to be controlled by a column enable signal and a second transistor is configured to be controlled by a row select signal.

The photodiode may comprise a single photon avalanche diode.

The row control circuitry may be configured to provide a control signal dependent on the row select signal, said control signal being provided to each of said pixels, said control signal being configured to control a quench of a photodiode in each respective pixel.

The memory may be configured to output the column enable signal.

The memory may comprise a state machine, defect memory connected to the state machine and active memory, wherein the defect memory will indicate which of the pixels of the plurality of pixel are faulty, and wherein the active memory defines which of the pixels in the plurality of pixels are active in a given read operation.

The control signal may only quench the photodiode in each respective pixel when the column enable signal, being provided to the first transistor, is also high.

The sensor may be configured such that if the column enable signal is low then a column disable transistor will conduct while the first transistor will not conduct, which reduces the voltage across the photodiode in each pixel below a breakdown voltage.

The sensor may be configured such that if the row select signal is high then a row disable transistor will conduct which reduces the voltage across the photodiode in each pixel below a breakdown voltage.

Each of the pixels in the plurality of pixels may comprise a buffer, the buffer comprising two inverters arranged in series.

The sensor may comprise a plurality of photon counting circuits configured to count the amount of photons detected by each of the plurality of pixels, The plurality of the photon counting circuits may be shared by two or more of the pixels of the plurality of pixels.

The sensor may be configured to activate a single row of pixels at a time, such that the row activation can be sequential and/or the row activation can be randomized.

The plurality of transistors may comprise MOSFET transistors.

The first transistor and second transistor may be NMOS transistors while the column disable transistor and row disable transistor may be PMOS transistors.

According to some embodiments, there is provided a method, comprising: providing a plurality of pixels arranged in a plurality of rows and columns, wherein each of said pixels comprises a photodiode and a plurality of transistors configured to control the activation of said photodiode; controlling which one of said rows is activated with a row select signal; controlling which one of said pixels in said activated row is to be activated with a column enable signal; and storing information indicative of which of said plurality of pixels are defective as the plurality of said rows and columns of pixels are activated.

The photodiode may comprise a single photon avalanche diode.

The method may comprise providing a control signal dependent on the row select signal, said control signal being provided to each of said pixels, said control signal controlling a quench of a photodiode in each respective pixel.

The column enable signal may be output by a memory.

The method may comprise indicating, by defect memory, which pixels of the plurality of pixels are active in a given read operation.

The method may comprise quenching the photodiode in each respective pixel when the column enable signal, being provided to a first transistor, is also high.

The method may comprise conducting, in a column disable transistor, when the column enable signal is low, which reduced the voltage across the photodiode in each pixel below a breakdown voltage.

The method may comprise conducting, in a row disable transistor, if the row select signal is high which reduces the voltage across the photodiode in each pixel below a breakdown voltage.

Each of the pixels in the plurality of pixels may comprise a buffer, the buffer comprising two inverters arranged in series.

The method may comprise counting, by photon counting circuits, the amount of photons detected by each of the plurality of pixels, The photon counting circuits may be shared by two or more of the pixels of the plurality of pixels.

The method may comprise activating a single row of pixels at a time, such that the row activation can be sequential and/or the row activation can be randomized.

The plurality of transistors may comprise MOSFET transistors.

The first transistor and a second transistor may be NMOS transistors while the column disable transistor and row disable transistor may be PMOS transistors.

According to some embodiments, there is provided an apparatus comprising means for: providing a plurality of pixels arranged in a plurality of rows and columns, wherein each of said pixels comprises a photodiode and a plurality of transistors configured to control the activation of said photodiode; controlling which one of said rows is activated with a row select signal; controlling which one of said pixels in said activated row is to be activated with a column enable signal; and storing information indicative of which of said plurality of pixels are defective as the plurality of said rows and columns of pixels are activated.

The photodiode may comprise a single photon avalanche diode.

The apparatus may comprise means for: providing a control signal dependent on the row select signal, said control signal being provided to each of said pixels, said control signal controlling a quench of a photodiode in each respective pixel.

The column enable signal may be output by a memory.

The method may comprise indicating, by defect memory, which pixels of the plurality of pixels are active in a given read operation.

The apparatus may comprise means for: quenching the photodiode in each respective pixel when the column enable signal, being provided to a first transistor, is also high.

The apparatus may comprise means for: conducting, in a column disable transistor, when the column enable signal is low, which reduced the voltage across the photodiode in each pixel below a breakdown voltage.

The apparatus may comprise means for: conducting, in a row disable transistor, if the row select signal is high which reduces the voltage across the photodiode in each pixel below a breakdown voltage.

Each of the pixels in the plurality of pixels may comprise a buffer, the buffer comprising two inverters arranged in series.

DETAILED DESCRIPTION

Figure 1:
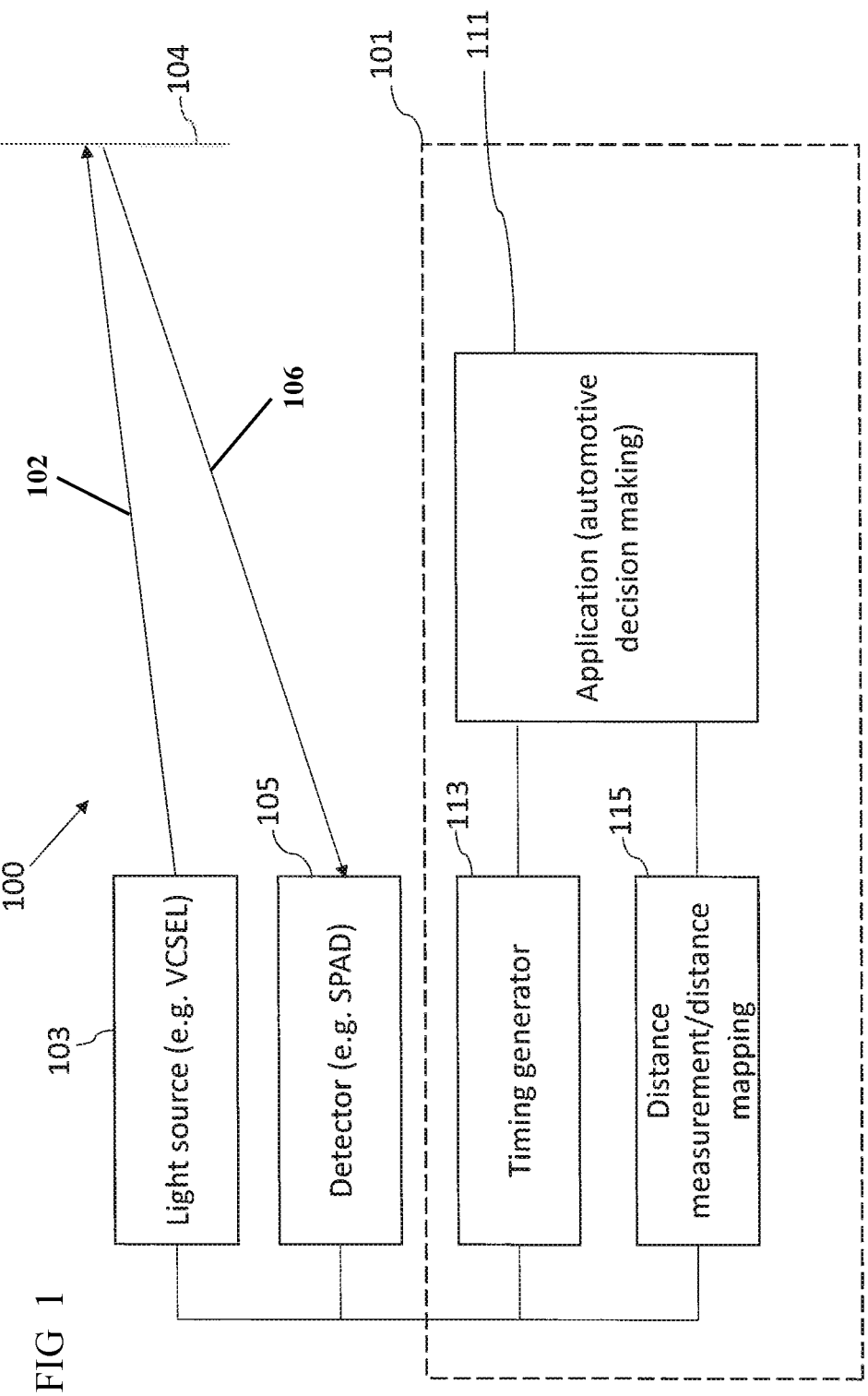
FIG. 1 shows schematically an example LIDAR system within which embodiments may be implemented according to some embodiments.

With respect to FIG. 1, an example range or distance measurement system 100 suitable for implementing some embodiments is shown in further detail. The system 100 comprises a light source 103. The light source may be considered to be a transmitter of the light used in the distance detection. The light source may be any suitable pulse (or wave) light source. For example, in some embodiments the light source may be one or more vertical cavity surface emitting laser light sources. A vertical cavity surface emitting laser is suitable as it is able to produce well defined pulses of suitable short duration. The light source 103 may further comprise or be coupled to various optics configured to collimate and/or focus the light source to a specific region or area. In some embodiments the light source comprises a mechanical or optical beam director configured to direct the light according to a defined pattern towards a target or surface 104. The emitted light 102 may then be incident on the surface 104 and reflected light 106 be received at a detector 105 of the system 100.

The detector 105 may comprise or be coupled to various optics configured to focus the returning light to a specific photosensitive region or area within the detector. The detector may be considered to be a receiver of the light used in the distance detection. In some embodiments the detector comprises or is associated with a mechanical or optical beam director (which in some embodiments is the same one as used by the light source 103) configured to direct the returning light according towards a specific photosensitive region or area within the detector. In some embodiments the detector 105 comprises a photosensitive region, for example an array of single photon avalanche diodes configured to convert the received light into electronic signals suitable for outputting.

A single photon avalanche diode (SPAD) is a semiconductor device capable of detecting light. A photon impinging on a detection region of a SPAD generates an electron and hole pair via the photoelectric effect. The SPAD is reverse-biased with a high voltage magnitude such that when the electron/hole carriers are generated, the electric field applied across the detection region causes the carriers to be accelerated to a relatively high velocity according to the strength and direction of the applied field. If the kinetic energy of the accelerated carriers is sufficient, additional carriers will be generated from the semiconductor lattice, which are in turn accelerated by the field, and may liberate further carriers in an exponentially increasing fashion. Thus, when a sufficiently high electric field is applied across the detection region, a single impinging photon may generate an avalanche of carriers, resulting in an output current 'pulse', where the current output is proportional to the number of photons detected.

The minimum voltage that causes an avalanche of carriers, and thus allow the device to operate as a SPAD, is known as the breakdown voltage. If the voltage applied is too low, i.e., below the breakdown voltage, then the device does not produce any output. However, if the voltage applied is too high, then it is possible that the electric field generated may be sufficient to cause a carrier avalanche even when there are no photons impinging on the SPAD, resulting in a false output current. This false output is known as a "dark current".

The system may comprise a timing generator (or controller) 113. In some embodiments the detector 105 and light source 103 may be controlled using a timing generator 113. The timing generator 113 can be configured to generate various timing or control pulses to control the light source, for example to control when and where the light is to be transmitted. The timing generator 113 may be configured to further control the detector, to activate some regions as being photosensitive or active and some other regions as being inactive.

The system may comprise a distance measurement/distance mapping unit 115. The distance measurement/mapping unit 115 can in some embodiments be configured to receive timing control information from the timing generator 113 and from the detector 105 (and in some embodiments the light source 103) and determine the distance between the system 100 and the surface 104 based on the time taken for the light to travel from the light source 103 to the surface 104 and from the surface 104 to the detector 105. The distance measurement/mapping unit 115 may, for example, be configured to generate a histogram of detected events (against time) and from the histogram determine a distance. In some embodiments the distance measurement/distance mapping unit 115 is configured to determine distances for more than one point or area and therefore determine a distance map.

In some embodiments the system 100 may comprise a suitable application 111 configured to be interfaced with the timing generator 113 and distance measurement/distance mapping unit 115. For example, the application may be an automotive brake decision unit, automotive navigation unit, computer vision unit or otherwise. The application 111 may, for example, receive the distance map or distance values and perform a decision or determination to control further apparatus based on the distance information. In some further embodiments the application 111 may furthermore be configured to control the timing generator to change the distance measurement parameters.

In some embodiments the timing generator 113, distance measurement/mapping 115 and application 101 may be implemented within a computer (running suitable software stored on at least one memory and on at least one processor), a mobile device, or alternatively a specific device utilizing, for example, FPGAs (field programmable gate arrays) or ASICs (application specific integrated circuits).

Figure 2:
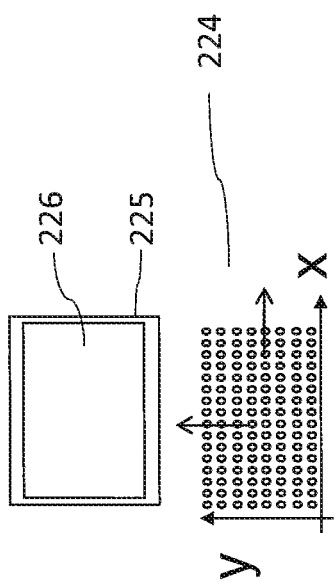
FIG. 2 shows a schematically an image sensor.

With respect to FIG. 2 a detector (receiver) configuration is schematically shown. The image sensor 225 comprises an area of sensitivity or detecting area 226. This sensing area is made up of an array of photodiodes, such as SPADs 224, forming the area of sensitivity. The array is configured to have a number of rows and columns of SPADs 224.

Figure 3A:
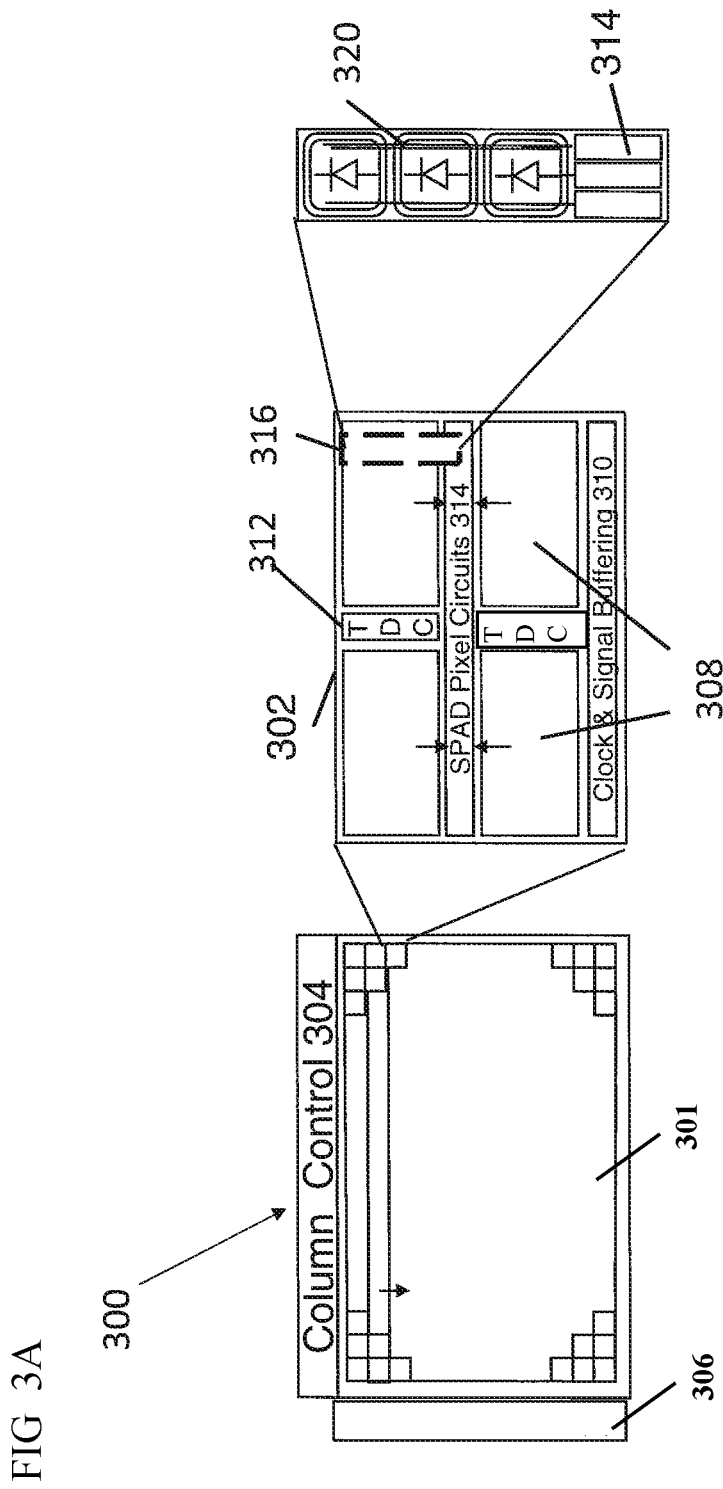
FIG. 3A schematically shows a sensor array.

Reference is made to FIG. 3A which shows a sensor 300 that may be used to implement the detector 105. The sensor 300 has an array 301 of macro pixels 302, arranged in X rows and Y columns, control circuitry 304, and row control circuitry 306. In this embodiment, one row may be active at a time. This is controlled by the row control 306. A macro pixel 302 is shown in more detail in FIG. 3A.

Figure 3B:
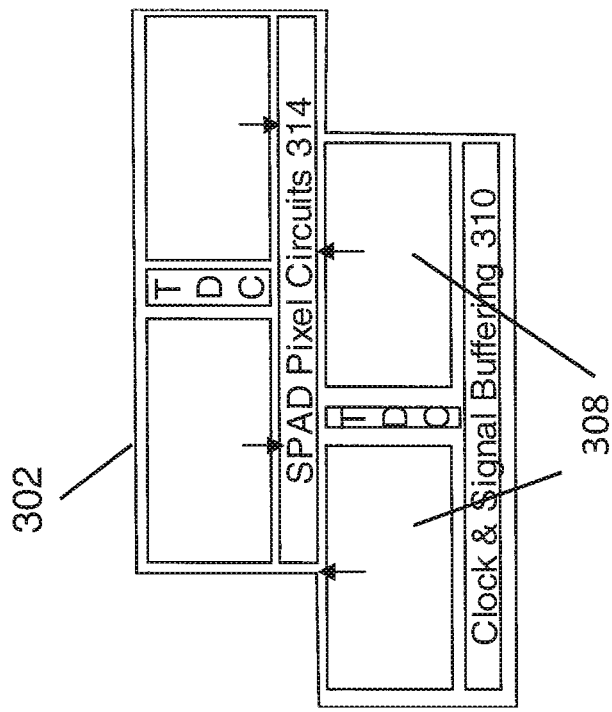
FIG. 3B schematically shows an alternate sensor array.

The macro pixels 302 have four wells 308. Each well 308 has N SPADs. As an example only, the value of N may be between 4 and 560. Preferably, the value of N may be between 8 and 112. More preferably, the value of N may be 28. In other examples the value of N may be higher or lower than 28. The four wells are arranged in a 2×2 arrangement. In FIG. 3A the two upper wells are directly above the two lower wells. In an alternative embodiment, as shown in FIG. 3B, the two upper wells are offset by a quarter macro pixel 302. As seen in FIG. 3B, the middle of the bottom left well lines up with the left end of the well above it. Even though FIGS. 3A and 3B show four wells 308 per macro pixel 302, in other examples, the numbers of wells provided per macro pixel may be higher than 4 or lower than 4.

The macro pixels 302 each have clock and signal buffering circuitry 310 along the lower edge of the two wells in the bottom row. TDC (time to digital convertor) circuitry 312 is provided between the first and second wells of the first row and between the first and second wells of the second row. SPAD pixel circuits 314 are arranged between the first and second rows of the macro pixel 302. The TDC circuitry may be used to increase timing resolution.

Part of the well 308 and associated SPAD pixel circuits 314 (shown by the dotted box referenced 316) is shown in more detail in FIG. 3. In this detail, three SPADs 320 are shown in a column and which share a cathode. A SPAD pixel circuit 314 is provided for each SPAD 320. Each SPAD pixel circuits will control the readout, charge storage, quenching, resetting, activation and deactivation of the respective SPAD.

In some scenarios, it may be desirable to provide a relatively high fill factor. To this end, some embodiments may be configured to provide a more compact SPAD pixel circuit to reduce the area occupied thereby. This means that the proportion of the macro pixel which is occupied by the SPADs may be increased.

In some embodiments, some SPADs may provide a relatively high DCR (dark count rate). This is a number of output pulses counted when the SPAD is not illuminated (i.e., no photons are received but an avalanche breakdown is still triggered). A SPAD with a high DCR in itself is not generally desirable but being able to manage SPADs with a high DCR means that the array may be less sensitive to issues arising from a relatively high DCR. Reducing DCR has an associated cost which can be avoided or reduced if the array is not sensitive to high DCR SPADs. The reduced cost may be, for example, a reduction in spatial sampling. If a pixel is turned off then it cannot be detected or sampled from.

It should be appreciated that embodiments may be used with any suitable size of array from those having only a few pixels to very large arrays. It should be appreciated that some embodiments may be used with arrays having, for example, hundreds of thousands, millions, or tens of millions of SPADs.

Power consumption may be managed in some embodiments. For example, high DCR SPADs may be gated. For example, rows of SPADs may be sequentially enabled. In particular, the memory which defines defective SPADs (that is one, for example, with a high DCR) is not provided in the pixel itself but is provided in the column control circuitry. The column control circuitry is used to control whether a SPAD is active or not (assuming the SPAD is in an activated row). This column control circuitry will provide an enable signal (which can be on or off) and a disable signal (which can be on or off). These signals are used to control whether a particular SPAD in an activated ROW is activated. Whilst this technique is used for avoiding the use of defective SPADs, this technique can also be used to select a subset of pixels in a row if there is a particular region of interest.

Some embodiments are such that a region of interest (ROI) of the array may be activated allowing random access across the array. The ROI can be any suitable ROI and may, for example, be one or more lines of SPADs. For example, a range of rows can be selected to get an ROI, while all other rows above and below the range are deactivated.

Figure 4:
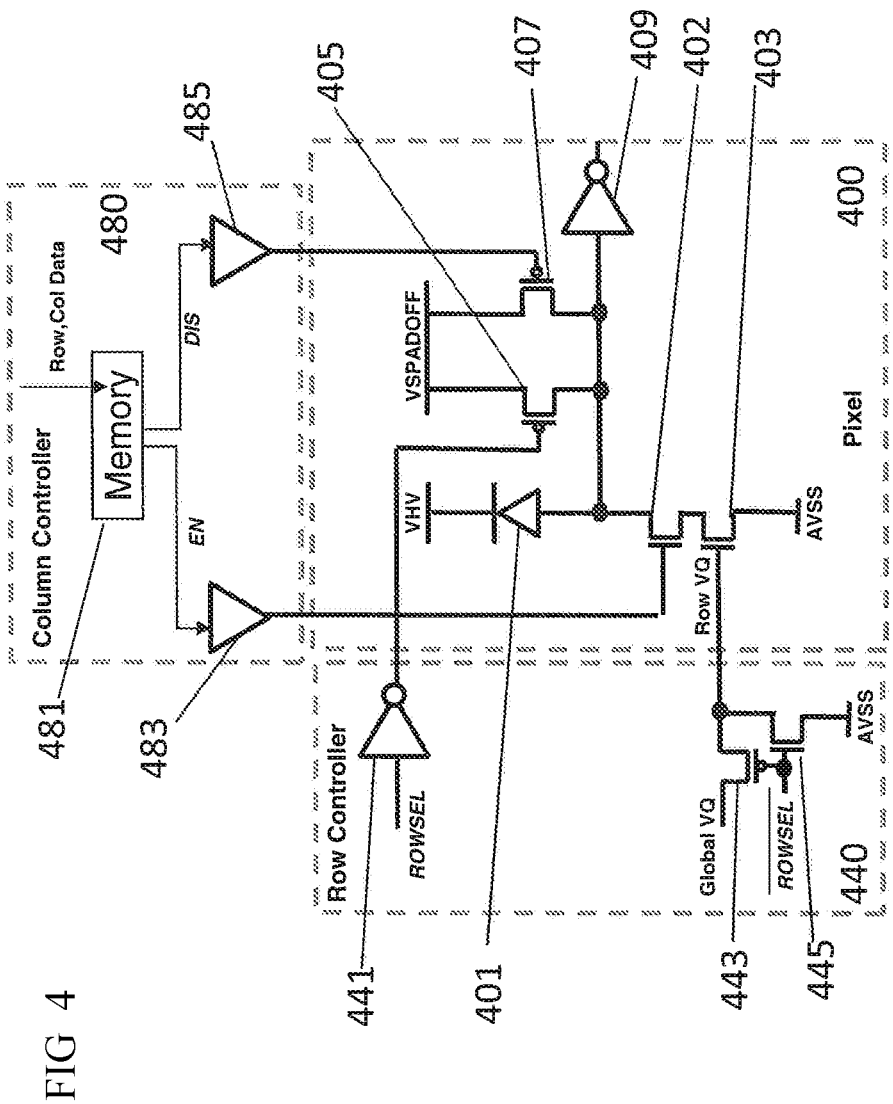
FIG. 4 shows a pixel of some embodiments.

Reference is made to FIG. 4, which shows a pixel 400 of some embodiments. The pixel may be used in an array such as previously described.

A row controller 440 and a column controller 480 are provided separately from the pixel 400.

The pixel 400 has a sensing stage which comprises a SPAD 401, a column enable MOSFET 402 and a quenching/reset device 403. The SPAD 401, the column enable MOS- FET 402 and the quenching/reset device 403 are arranged in series between VHV (i.e., a power supply) and AVSS (i.e., ground). The SPAD 401 may detect photons and trigger an avalanche current.

The column enable MOSFET 402 can receive a signal from the column controller 480. In this example the column enable MOSFET 402 is an NMOS transistor. If the signal received at the gate of the column enable MOSFET 402 is high then the column enable MOSFET 402 will conduct and enable the pixel. In this example the quenching/reset device 403 is also an NMOS transistor. The quenching/reset device 403 may receive from the row controller 440 a SPAD reset signal (Row VQ) which when high causes the quenching/reset device 403 to conduct and causes the avalanche to be quenched.

The pixel 400 comprises MOSFET devices 405, 407 arranged in parallel between the voltage terminal VSPAD-OFF and the node between the SPAD 401 and the column enable MOSFET 402. In this example, the MOSFET devices 405, 407 are PMOS transistors. The MOSFET device 405 may receive a row disable signal which will disable the pixel. If the row disable signal is low then the MOSFET device 405 will conduct and the pixel 400 will be disabled. This row disable signal can be sent by the row controller 440. The MOSFET device 407 may receive a column disable signal which will disable the pixel. If the column disable signal is low then the MOSFET device 407 will conduct and the pixel 400 will be disabled. This column disable signal can be sent by the column controller 480. The avalanche current from the sensing stage passes, when the MOSFET devices 405, 407 are off (that is the disable signals to the MOSFETs 405, 407 is high), into a first inverter 409.

The row controller 440 comprises a second inverter 441 with a row selection signal input labelled ROWSEL. The second inverter 441 is connected to the gate of the first MOSFET 405. In this way the row controller may provide the row disable signal to the pixel 400 which will disable the pixel when ROWSEL is high (due to the inverter). The row controller has a quench triggering circuit comprising MOSFET devices 443, 445. In this example, MOSFET device 443 is a PMOS transistor and MOSFET device 445 is an NMOS transistor. The ROWSEL signal is input to the gates of the MOSFET devices 443, 445. The drain of MOSFET device 443 is connected to the drain of MOSFET device 445 which is in turn connected to the gate of quenching/reset device 403 in the pixel 400. The source of the MOSFET device 443 is connected to Global VQ (i.e. a global reference voltage). The source of the MOSFET device 445 is connected to AVSS (i.e. ground). When the ROWSEL signal is high the MOSFET device 443 will not conduct and the MOSFET device 445 will conduct. In this situation there will be a low input to the gate of the quenching/reset device 403, which will cause the quenching/reset device 403 to not conduct. When the ROWSEL signal is low the MOSFET device 443 will conduct and the MOSFET device 445 will not conduct. In this situation there will be a high input to the gate of the quenching/reset device 403, which will cause the quenching/reset device 403 to conduct. If the quenching/reset device 403 is conducting and the column enable MOSFET 402 is also conducting then this will allow an avalanche quench/reset.

The column controller 480 comprises memory 481. The memory 481 could be any sort of suitable memory. Row and column data for the pixel will be input into the memory 481 for storage. The memory 481 can output a high or a low output, an enable signal (EN) and/or a disable signal (DIS) into a buffer gates 483, 485 respectively. The output of the buffer gate 483 is connected to the gate of the column enable MOSFET 402. If the EN signal and DIS signals are high then the column enable MOSFET 402 will conduct. The output of the buffer gate 485 is connected to the gate of the MOSFET device 407. If the EN and DIS signals are low then the MOSFET device 407 will conduct and MOSFET 402 will stop conducting. This reduces the voltage across the SPAD 401, taking the SPAD 401 below breakdown voltage preventing avalanches occurring. The same effect occurs when the ROWSEL signal is high, MOSFET 403 stops conducting and MOSFET 405 conducts, taking the SPAD 401 below breakdown and preventing operation. MOSFET devices 402, 403, 405, 407 form a NAND gate. The NAND gate in the pixel provides the function that the pixel is activated if the ROWSEL, Global VQ and column EN are all high.

FIG. 4 shows only a single pixel 400 with the row controller 440 and the column controller 480. However, the row controller 440 will be connected to a plurality of pixels and will control the pixels as a row. The column controller 480 will be connected to a plurality and pixels and will control the pixels as a column.

The row controller 440 and column controller 480 being separated from the pixel 400 may allow for a high resolution SPAD array with a high fill factor. This pixel layout provides a high resolution SPAD array with integrated timing. This system may be suitable for use with LIDAR. This layout allows individual rows and individual columns of pixels to be turned off or on using the row controller 440 or the column controller 480. Furthermore, the layout can be more compact as there is a maximum of 2 N-wells for PMOS (instead of 4).

In legacy systems, a memory, a row controller and a column controller would be provided for each individual pixel. This reduces the resolution of the SPAD array as fewer pixels can be arranged in a space. For example, in some previous proposals the transistors 443 and 440 would have been provided in each pixel. In some previous proposals, each pixel would be provided with a memory, to indicate if the pixel is defective or not.

Figure 5:
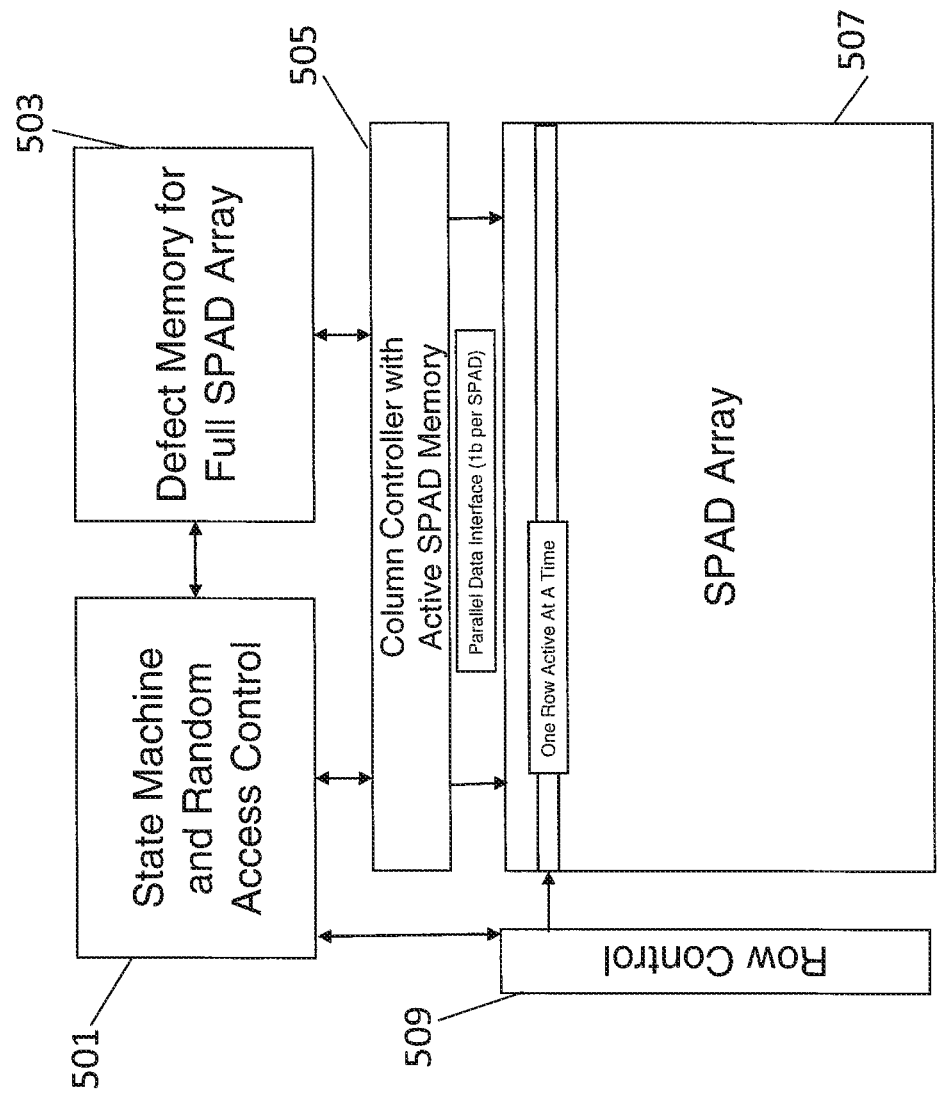
FIG. 5 shows a schematic view of a sensor array of some embodiments.

In reference to FIG. 5 which schematically shows a sensor array architecture of some embodiments, there is provided a state machine and random access control 501. A defect memory 503 for the full SPAD array is connected to the state machine and random access control 501. The defect memory 503 will indicate which of the SPADs of the array are faulty and should not be used. Both the state machine and random access control 501 and the defect memory 503 are connected to active SPAD memory 505 which defines which of the SPADs are active in a given read operation. The state machine and random access control 501, the defect memory 503 and the active SPAD memory 505 are connected to the SPAD array 507 through the column controller 480 of FIG. 4. The state machine and random access control 501 may also be connected to a row control 509.

The active SPAD memory 505 is connected to the SPAD array 507. The active SPAD memory may be connected by a parallel data interface (1 bit per SPAD) to the SPAD array 507. Any other suitable connection may also be used.

The row control 509 is provided which is connected to the SPAD array 507. The row control 509 may be connected by a parallel data interface SPAD array 507. In this arrangement only one row is active at a time. Any other suitable connection may also be used. The column controller is used to select which SPADs of the array are active for sensing. This may be the entire row other than defect SPADs in some embodiments.

As shown in FIG. 5, the memory (i.e., the state machine and random access control 501, the defect memory 503 and the active SPAD memory 505) are provided at the edge of the array. This may allow for a higher image resolution as there are more SPAD in the sensing part of the array.

Figure 6:
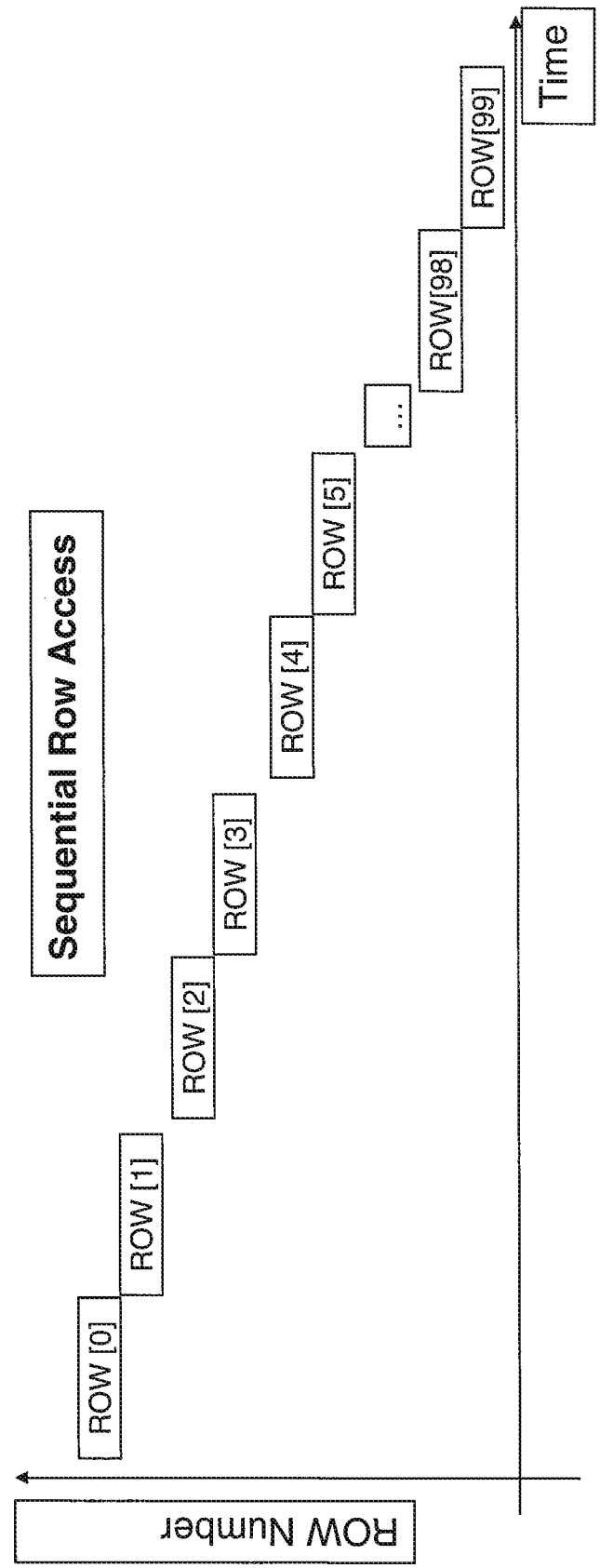
FIG. 6 show a schematic representation of row activation against time.

The SPAD array 507 can be activated one row at a time. Reference is made to FIG. 6 which shows a schematic representation of row activation against time. As shown in FIG. 6 the row access can be sequential access where row 0 is accessed first, followed by row 1 and so on.

Figure 7:
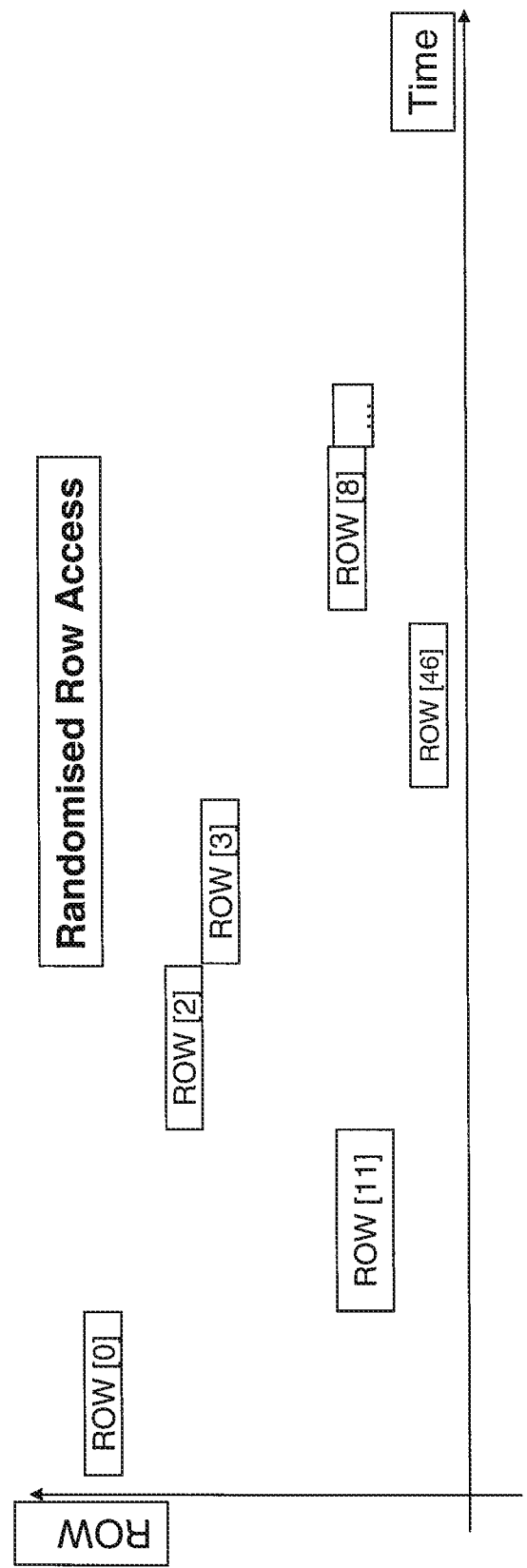
FIG. 7 shows another schematic representation of row activation against time.

Reference is made to FIG. 7 which shows another schematic representation of row activation against time. As shown in FIG. 7 the row access can be randomized row access where row 0 is accessed first, followed by row 11, followed by row 2 and so on.

It should be appreciated that in other embodiments, any suitable pattern of row access may be used.

In embodiments, the row access can be changed from sequential access to randomized access or vice versa at any time. Alternatively or additionally, any other suitable access patterns may be used.

Referring back to FIG. 5, the defect memory may be accessed by the state machine and random access control 501 to control which of the SPADs of an activated row are to be active (so the defective SPADs are not activated). The state machine and random access control 501 can activate SPADs at any time during a LIDAR frame.

Figure 8:
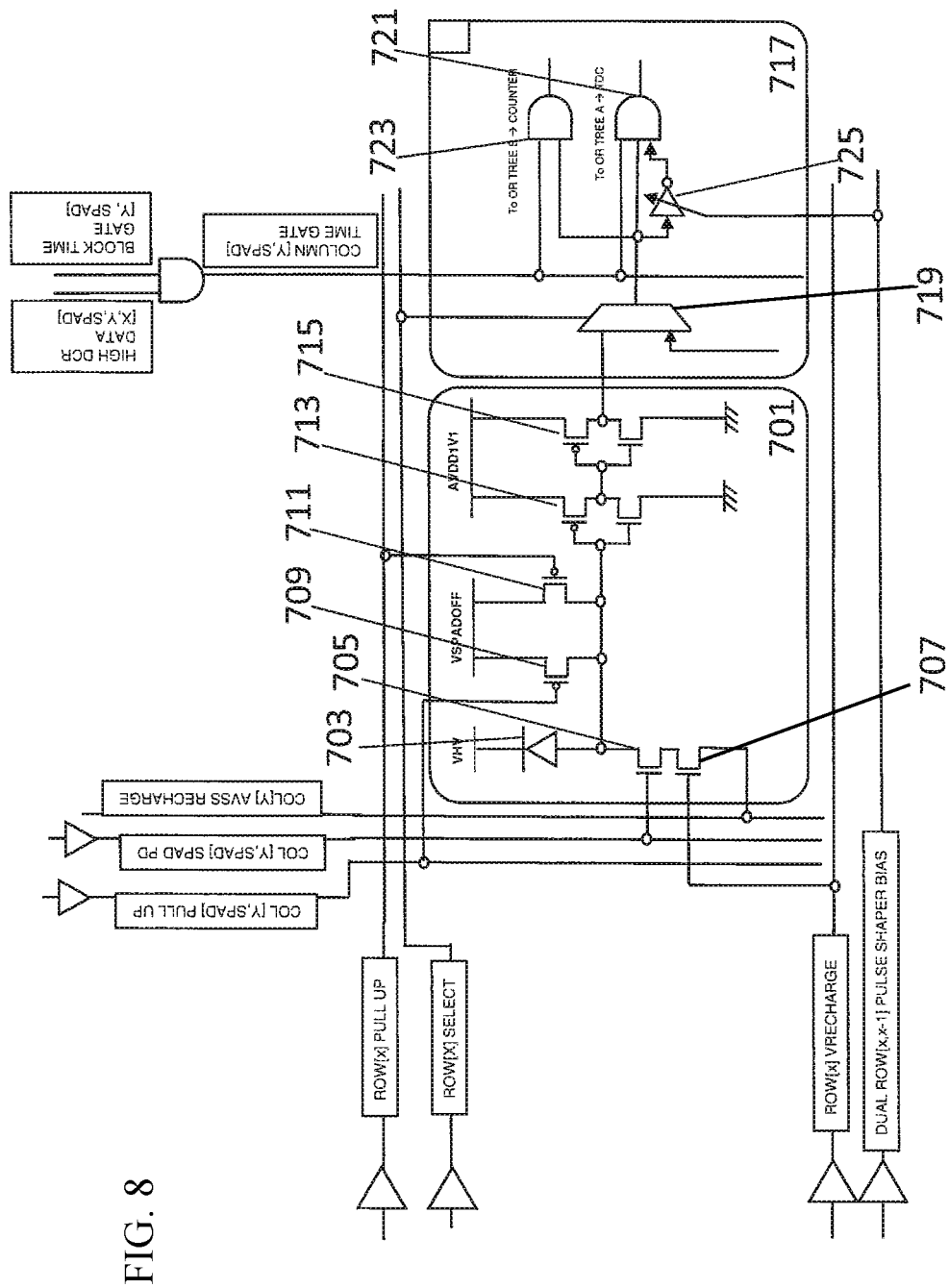
FIG. 8 shows the arrangement of a pixel circuitry in some embodiments.

Referring to FIG. 8, there is provided a pixel 701 including a SPAD 703. The layout of this pixel 701 is similar to the pixel 400 described in FIG. 4 but shows the readout aspects of the pixel in more detail. The pixel 701 has sensing stage comprising the SPAD 703, a column enable MOSFET 705 and a quenching/reset device 707. The SPAD 703, the column enable MOSFET 705 and the quenching/reset device 707 are arranged in series between VHV (i.e., power supply) and AVSS (i.e., ground). The SPAD 703 may detect a photon and trigger an avalanche current. In this example the column enable MOSFET 705 is an NMOS transistor. The column enable MOSFET 705 may receive a gate signal from the input labelled COL [Y, SPAD] SPAD PD. If COL [Y, SPAD] SPAD PD is high then the column enable MOSFET 705 will conduct. The quenching/reset device 707 may receive a signal on its gate from the input labelled ROW[x] VRECHARGE. If this signal is high then the quenching/reset device 707 will conduct. If the column enable MOSFET 705 and the quenching/reset device 707 are both conducting then this will cause an avalanche current to be quenched/reset.

The pixel 701 comprises MOSFET devices 709, 711 arranged in parallel between VSPADOFF and the node between the SPAD 703 and the column enable MOSFET 705.

In this example, the MOSFET devices 709, 711 are PMOS transistors. The MOSFET device 709 may receive a gate signal from the input labelled COL[Y, SPAD] PULL UP. If COL[Y, SPAD] PULL UP is low then the MOSFET device 709 will conduct and pull up the output signal from the SPAD 703. This may disable the pixel 701. The MOSFET device 711 may receive a gate signal from the input labelled ROW[X] PULL UP. If ROW[X] PULL UP is low then the MOSFET device 711 will conduct and pull up the output signal from the SPAD 703. This may disable the pixel 701. The output from the MOSFET devices 709, 711 feeds into a pair of CMOS inverters 713, 715 arranged in series. The two series CMOS inverters 713, 715 form a buffer.

The output of the buffer is connected to a multiplexer 719 of a pixel output circuit 717. The pixel output circuit 717 may be shared by two pixels 701 with respective SPADs. In other examples, the pixel output circuit 717 may be shared more than two pixels 701. The multiplexer 719 has a second input from the output of a buffer from another pixel 701. The multiplexer 719 has a selection input from an input labelled ROW[X] SELECT which will determine which output the multiplexer 719 will forward. The output of the multiplexer 719 is input into AND gates 721, 723. The AND gates 721, 723 each have a second input from an input labelled COLUMN [Y, SPAD] TIME GATE. The AND gate 721 also has an input from a pulse shaper 725. The AND gate 721 and the pulse shaper 725 form an integrated Time-Gate and Pulse Shaper.

The AND gate 721 outputs to an OR Tree to a Time-to-Digital converter. The AND gate 723 outputs to an OR tree to a counter. The value provided by the counter represents the photons collected by a respective SPAD.

The secondary output from the AND gate 723 is provided to a monitoring counter, which may match the dynamic enabling/disabling scheme. The monitoring counter allows a check to see if the SPADs have too much light on them. In this case the SPAD(s) may be stuck high and outputting a '1' (high output) all the time. The pulse shaper 725 always outputs '0' to the OR tree, therefore the AND gate 723 without the pulse shaper 725 is configured to determine if the SPAD(s) is in the very high light case.

Figure 9:
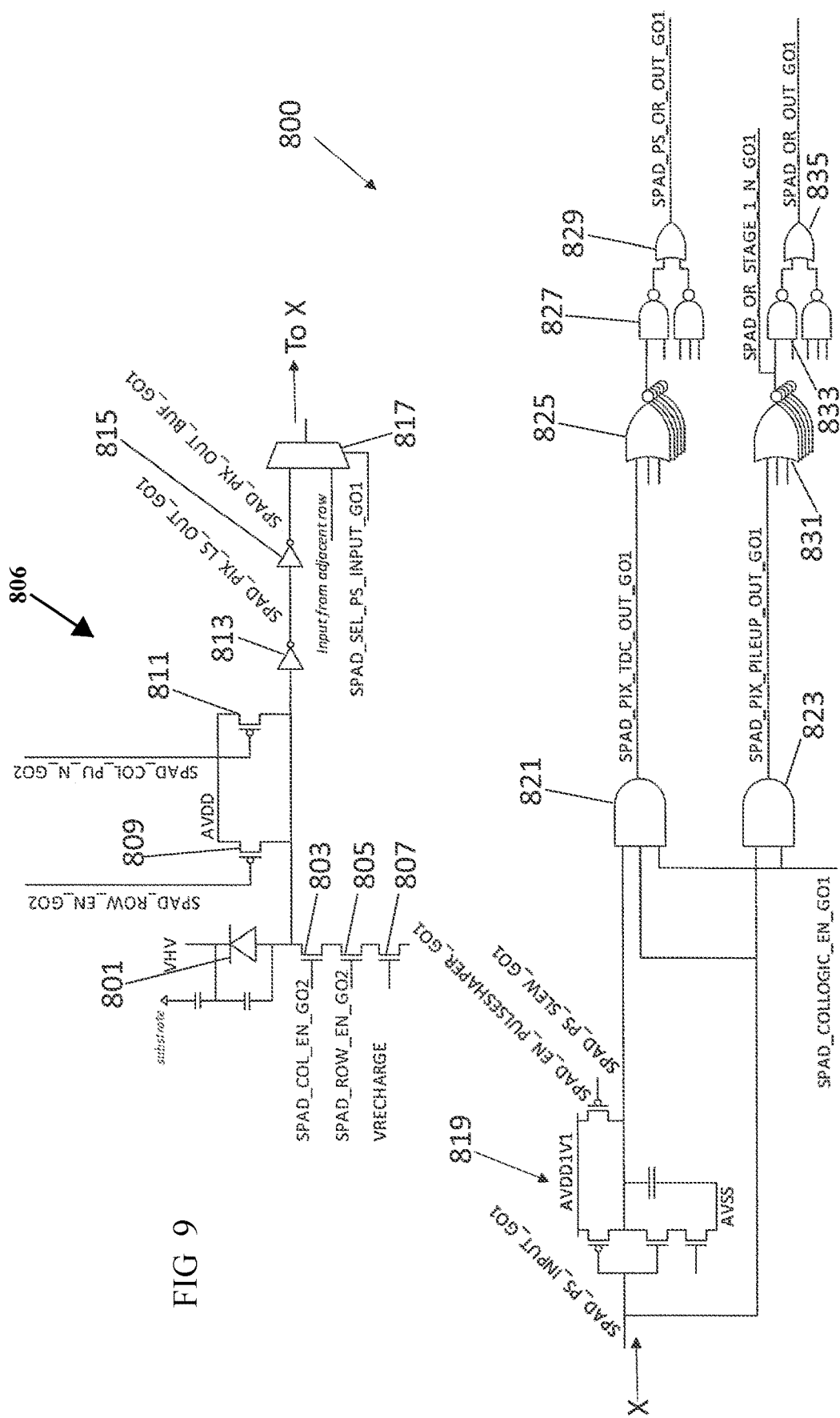
FIG. 9 shows another example of pixel circuitry in some embodiments.

FIG. 9 schematically shows a circuit 800 similar to that described in FIG. 8. The circuit 800 has a pixel 806 comprising a SPAD 801, a column enable MOSFET 803, a row enable MOSFET 805 and a quenching/reset device 807. The SPAD 801, the column enable MOSFET 803, the row enable MOSFET 805 and the quenching/reset device 807 are arranged in series between VHV (i.e., power supply) and ground. The SPAD 801 may detect a photon and trigger an avalanche current. In this example the column enable MOSFET 803, the row enable MOSFET 805 and the quenching/reset device 805 are NMOS transistors. In other examples, any other suitable transistor or switch may be used. The column enable MOSFET 803 may receive a gate signal from the input labelled SPAD_COL_EN_GO2. The row enable MOSFET 803 may receive a gate signal from the input labelled SPAD_ROW_EN_GO2. The column enable MOSFET 803 may function in a similar way as described with FIG. 7. The row enable MOSFET 805 may function a similar way as the column enable MOSFET 803. The quenching/reset device 807 may receive a gate signal from the input labelled VRECHARGE. The quenching/reset device 807 may function in a similar way as described with FIG. 7.

In embodiments, this configuration of pixel circuitry allows for single row activation of SPADs/pixels. Therefore, SPADs can be enabled or disabled to mask high DCR devices. Once a high DCR SPAD is identified in the array the corresponding row and column controller can selectively disable that high DCR SPAD. In other examples, SPADs may be enabled or disabled based on other metrics. In some examples, this allows for the dynamic enabling/disabling of pixels to manage dynamic range in laser shot timing. Turning SPADs on may mean more SPAD avalanches and therefore more SPAD events. Turning SPADs off may mean less SPAD avalanches and therefore less SPAD events. Therefore, turning on more SPADs allows for a higher signal and turning off SPADs for a smaller signal gives a relatively high dynamic range (signal count). By dynamically changing the SPADs that are on or off the signal rate can be controlled over a relatively large range.

In some examples, this pixel configuration allows for full testing of all of the transistors in all of the pixels for automatic testing. For example, all electrical testing of the pixel can be performed without using any of the SPADs.

The pixel 806 comprises MOSFET devices 809, 811 arranged in parallel between AVDD (i.e., power supply) and the node between the SPAD 801 and the column enable MOSFET 803. In this example, the MOSFET devices 809, 811 are PMOS transistors. The MOSFET device 809 may receive a gate signal from the input labelled SPAD_ROW_EN_GO2. If SPAD_ROW_EN_GO2 is low then the MOSFET device 809 may conduct and pull up the output signal from the SPAD 801. The MOSFET device 811 may receive a gate signal from the input labelled SPAD_COL_EN_GO2. If SPAD_COL_EN_GO2 is low then the MOSFET device 811 may conduct and pull up the output signal from the SPAD 801. The output from the MOSFET devices 809, 811 feeds into a pair of inverters 813, 815 arranged in series. The two series inverters 813, 815 form a buffer. The output from the buffer is connected to an input of a multiplexer 817. Another input to the multiplexer 817 is received from the pixel of an adjacent row. Therefore, the multiplexer 817 may be considered as a shared multiplexer. In this example, the multiplexer 817 is shared by two pixels. In other example the multiplexer 817 may be shared by more pixels. The multiplexer has a selection input from an input labelled SPAD_SEL_PS_INPUT_GO1. The SPAD_SEL_PS_INPUT_GO1 signal will determine which multiplexer input is selected for output.

The output of the multiplexer 817 is connected to a pulse shaper 819. The pulse shaper 819 may be enabled to reshape the pulses generated by SPAD 801. The pulse shaper 819 may be configured to shape an output from the SPAD 801 in a normal mode of operation and a calibration signal in a calibration mode of operation. The pulse shaper 819 may be used to shorten the pulse length and reduce the effect of pileup for a given SPAD count rate. The input signal SPAD_PSINPUT_GO1 will be shortened or truncated by the pixel shaper 819 to produce a useful output signal labelled SPAD_PS_SLEW_GO1. The output of the multiplexer 817 is also connected to the input of AND gates 821, 823. A second input to the AND gates 821, 823 is received from an input labelled SPAD_COLLEGIC_EN_GO1. The output of the AND gate 821 (SPAD_PIX_TDC_OUT_GO1) is connected to a pile up NOR tree 825. In other examples, this may be a pile up OR tree. Each of the NOR gates of the pile up NOR tree 825 is connected to a NAND gate 827. Each NAND gate is connected to an input of an OR gate 829. The output of the AND gate 823 (SPAD_PIX_PILEUP_OUT_GO1) is connected to a pile up NOR tree 831. In other examples, this may be a pile up OR tree. Each of the NOR gates of the pile up NOR tree 831 is connected to a NAND gate 833. Each NAND gate is connected to an input of an OR gate 835.

In some applications, such as optical communications or light detection and ranging (LIDAR), a device comprises both a light emitter and a SPAD detector. The light emitter may, for example, be a vertical cavity surface emitting laser (VCSEL). Other embodiments may use other suitable light sources.

In the example of a LIDAR system, light may be emitted by a VCSEL. When the emitted light reaches a target within the field of view of the device, a portion of the light may be reflected back to the SPAD detector. If the voltage applied to the SPAD is too low, then it is not possible to determine whether no light is being received is a result of the SPAD being improperly biased, or if there is no target within the field of view.

It should be understood that the use of the various transistors in the above described embodiments are only one such example of possible devices. It would be understood by those skilled in the art that any other suitable transistor may be used. For example, a p-type FET may be used instead of an n-type FET or the like. It should be appreciated that alternatively or additionally, different types of transistor may be used such as bipolar transistors or MOSFETs.

The apparatus described above may be implemented in any device or apparatus which utilizes SPAD. For example, the apparatus and method described above may be implemented in a LIDAR system. It should be understood that this non-limiting implementation is only exemplary, and the apparatus and method may be implemented in any manner of other light-detecting applications.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor, comprising:
   a plurality of pixels arranged in a plurality of rows and columns, each pixel including:
      a photodiode;
      a first transistor coupled to the photodiode and configured to receive a column enable signal; and
      a second transistor coupled to the photodiode and configured to receive a column disable signal.

2. The sensor of claim 1, wherein each pixel includes a third transistor coupled in series with the first transistor and configured to receive a reset signal.

3. The sensor of claim 2, wherein each pixel includes a fourth transistor coupled in parallel with the second transistor and configured to receive a row disable signal.

4. The sensor of claim 1, wherein each pixel includes a buffer having:
   an input coupled to the photodiode; and
   an output.

5. The sensor of claim 4, wherein each buffer includes:
   a first inverter having an input corresponding to the input of the buffer; and
   a second inverter coupled in series with the first inverter and having an output corresponding to the output of the buffer.

6. The sensor of claim 4, comprising a plurality of pixel output circuits each coupled to the output of the buffer of two or more pixels.

7. The sensor of claim 6, wherein each pixel output circuit includes a multiplexer having:
   a plurality of inputs each coupled to the output of the buffer of a respective pixel;
   a control input configured to receive a row select signal; and
   an output.

8. The sensor of claim 7, wherein each pixel output circuit includes a pulse shaper coupled to the output of the multiplexer.

9. The sensor of claim 8, wherein each pixel output circuit includes a first AND gate having:
   a first input coupled to the output of the multiplexer; and
   a second input coupled to an output of the pulse shaper.

10. The sensor of claim 9, wherein each pixel output circuit includes a second AND gate having:
    a first input coupled to the output of the multiplexer; and
    a second input coupled to a third input of the first AND gate.

11. A sensor, comprising:
    a plurality of pixels arranged in a plurality of rows and columns, each pixel including:
      a photodiode;
      a first transistor coupled to the photodiode and configured to receive a column disable signal; and
      a second transistor coupled to the photodiode in parallel with the first transistor and configured to receive a row disable signal; and
    a plurality of pixel output circuits each coupled to two or more of the pixels.

12. The sensor of claim 11, wherein each pixel includes:
    a third transistor coupled to the photodiode and configured to receive a column enable signal; and
    a fourth transistor coupled to the photodiode in series with the third transistor and configured to receive a pixel reset signal.

13. The sensor of claim 11, wherein the first and second transistors are PMOS transistors and third and fourth transistors are NMOS transistors.

14. The sensor of claim 13, wherein the first and second transistors each include a respective source terminal coupled to a supply voltage and a respective drain terminal coupled to the photodiode.

15. The sensor of claim 14, wherein a third transistor has a drain terminal coupled to the photodiode and a source terminal coupled to a drain terminal of a fourth transistor, wherein a source terminal of the fourth transistor is coupled to ground.

16. The sensor of claim 11, comprising:
    row control circuitry configured to selectively control activation of the rows with row select lines respectively coupled to the pixel output circuits; and
    column control circuitry that selectively controls which of the pixels in an activated row is to be activated, the column control circuitry including a memory configured to store information indicating which pixels of the plurality of pixels are defective, wherein the column control circuitry is configured to disable a defective pixel in the activated row by sending the column disable signal to the first transistor of the defective pixel based on the information in the memory.

17. A method, comprising:
    enabling a pixel of a plurality of pixels arranged in rows and columns by providing a column enable signal to a first transistor of the pixel;
    sensing light with a photodiode of the pixel, wherein the photodiode is coupled to the first transistor; and
    disabling the pixel by:
      providing a column disable signal to a second transistor of the pixel coupled to the photodiode; and
      providing a row disable signal to a third transistor of the pixel coupled in parallel with the second transistor.

18. The method of claim 17, comprising selecting the pixel by providing a row select signal to a pixel output circuit coupled to two or more pixels of the plurality of pixels.

19. The method of claim 18, wherein selecting the pixel includes providing the row select signal to a multiplexer of the pixel output circuit.

20. The method of claim 19, comprising shaping an output of the pixel output circuit with a pulse shaper coupled to the multiplexer.

* * * * *